(12) United States Patent
Sano et al.

(10) Patent No.: US 11,223,295 B2
(45) Date of Patent: Jan. 11, 2022

(54) CAPACITOR DEVICE

(71) Applicant: DENSO CORPORATION, Kariya (JP)

(72) Inventors: Tomohisa Sano, Kariya (JP); Daisuke Harada, Kariya (JP); Seido Araki, Nagakute (JP); Yohei Imai, Tougou-cho (JP); Kentaro Hirose, Okazaki (JP)

(73) Assignee: DENSO CORPORATION, Kariya (JP)

( * ) Notice: Subject to any disclaimer, the term of this patent is extended or adjusted under 35 U.S.C. 154(b) by 59 days.

(21) Appl. No.: 16/564,270

(22) Filed: Sep. 9, 2019

(65) Prior Publication Data

US 2020/0091833 A1 Mar. 19, 2020

(30) Foreign Application Priority Data

Sep. 13, 2018 (JP) .............................. JP2018-171535

(51) Int. Cl.
*H02M 7/00* (2006.01)
*H02M 7/53* (2006.01)
*H02M 7/48* (2007.01)

(52) U.S. Cl.
CPC ........... *H02M 7/003* (2013.01); *H02M 7/006* (2013.01); *H02M 7/53* (2013.01); *H02M 7/4815* (2021.05)

(58) Field of Classification Search
CPC ...... H02M 7/003; H02M 7/5387; H02M 7/53; H02M 7/006; H02M 3/07; H02M 3/158; H02M 2007/4815; H01G 2/10; H01G 2/00
See application file for complete search history.

(56) References Cited

U.S. PATENT DOCUMENTS

2015/0256096 A1    9/2015  Nishizawa et al.
2017/0347485 A1*  11/2017  Ishii ..................... H02M 7/003

FOREIGN PATENT DOCUMENTS

JP          2014-045035 A      3/2014

\* cited by examiner

*Primary Examiner* — Bryan R Perez
(74) *Attorney, Agent, or Firm* — Oliff PLC

(57) ABSTRACT

In a capacitor device for transferring power between a power source and a target component including an electronic and/or electric component, at least one capacitor is housed in a capacitor case. A busbar is drawn out from the capacitor case. The busbar electrically connects the at least one capacitor to the target component. The capacitor case includes at least first, second, and third fixture members for fixation of the capacitor case. The third fixture member is located to be separated from a virtual line connecting between a first reference point of the first fixture member and a second reference point of the second fixture member, and located to be closer to the target component than the first and second fixture members are. The busbar is located to be closer to the third fixture member than to the virtual line.

6 Claims, 8 Drawing Sheets

CAPACITOR DEVICE

CROSS-REFERENCE TO RELATED APPLICATION

This application is based on and claims the benefit of priority from earlier Japanese Patent Application No. 2018-171535 filed on Sep. 13, 2018, the description of which is incorporated herein by reference.

TECHNICAL FIELD

The present invention relates to capacitor devices.

BACKGROUND

A known capacitor device constitutes at least part of a power converter installable in vehicles, such as electric vehicles or hybrid vehicles. Such a capacitor device includes a filter capacitor comprised of plural capacitor elements, a smoothing capacitor comprised of plural capacitor elements, and a capacitor case in which the filter capacitor and smoothing capacitor are installed.

SUMMARY

According to an aspect of the present disclosure, there is provided a capacitor device includes a capacitor case that includes at least first, second, and third fixture members for fixation of the capacitor case. The third fixture member is located to be separated from a virtual line connecting between a first reference point of the first fixture member and a second reference point of the second fixture member, and located to be closer to the target component than the first and second fixture members are. The busbar is located to be closer to the third fixture member than to the virtual line.

BRIEF DESCRIPTION OF THE DRAWINGS

Other aspects of the present disclosure will become apparent from the following description of embodiments with reference to the accompanying drawings in which.

DETAILED DESCRIPTION OF EMBODIMENT

Viewpoint

Figure 1:
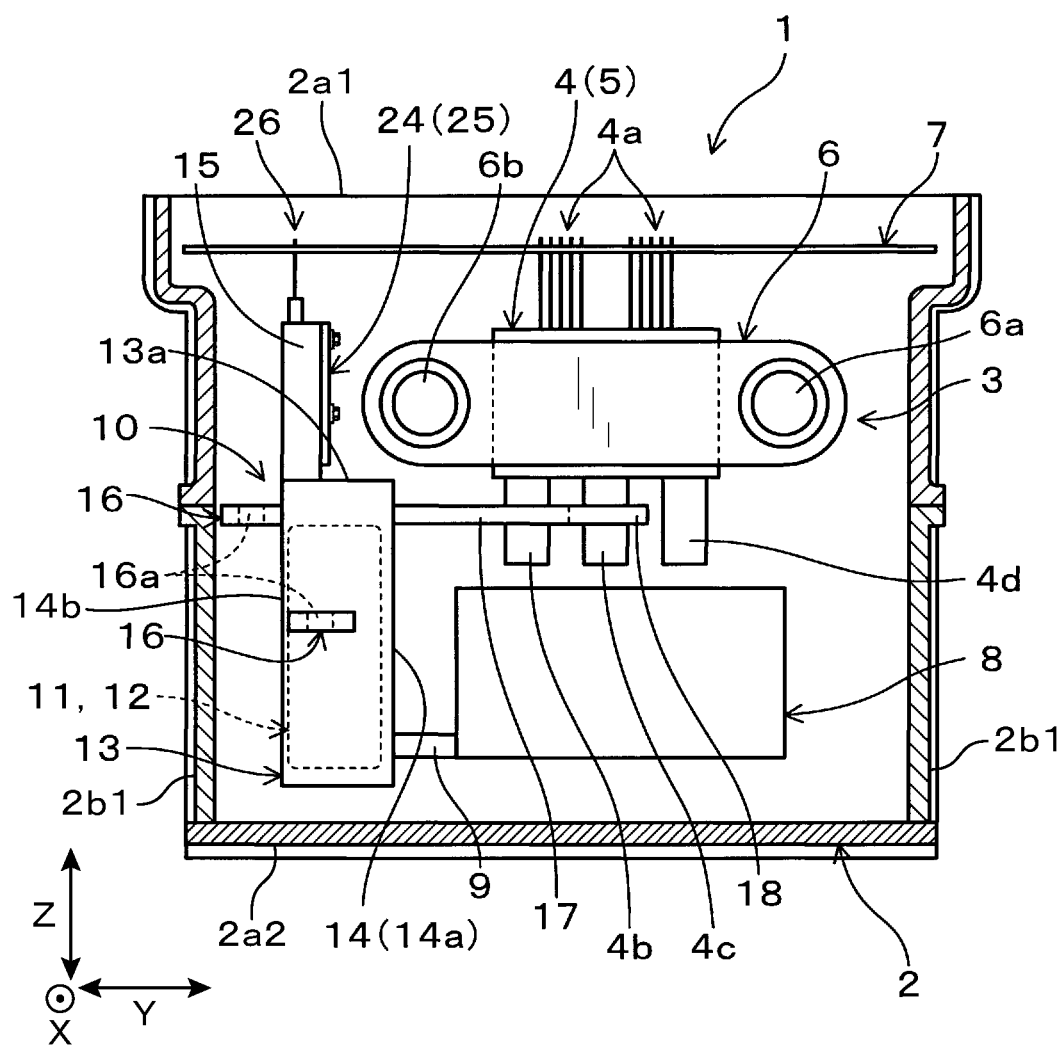
FIG. 1 is a cross-sectional view of a power converter according to the first embodiment of the present disclosure.

A known capacitor device, an example of which is disclosed in Japanese Patent Application Publication No. 2014-45035, constitutes at least part of a power converter installable in vehicles, such as electric vehicles or hybrid vehicles. Such a capacitor device includes a filter capacitor comprised of plural capacitor elements, a smoothing capacitor comprised of plural capacitor elements, and a capacitor case in which the filter capacitor and smoothing capacitor are installed.

Such a capacitor device includes busbars, i.e. capacitor terminals, for the filter capacitor and smoothing capacitor. Each of the busbars has opposing first and second ends, the first end of each busbar is connected to a corresponding one of the filter capacitor and smoothing capacitor, and the second end of each busbar is drawn out from the capacitor case and extends therefrom. The second ends of the respective busbars are electrically connected to semiconductor modules constituting the power converter.

The busbars drawn out from the capacitor case of the known capacitor device described above are easily subjected to load stress due to vibrations. In particular, the known capacitor device, which is configured such that the capacitors and busbars are integrated with each other, load stress imposed on the busbars may become greater, because the size and weight of the capacitor device becomes greater.

From this viewpoint, designers for such a capacitor device are requested to create a simpler, i.e. a lower-cost, structure of the capacitor device to improve resistance of the busbars to vibrations.

For addressing such a request, the present disclosure seeks to provide capacitor devices, each of which is capable of improving resistance of a busbar to vibrations with a simpler structural idea.

According to an exemplary aspect of the present disclosure, there is provided a capacitor device for transferring power between a power source and a target component including an electronic and/or electric component. The capacitor device includes at least one capacitor, a capacitor case configured to house the at least one capacitor, and a busbar drawn out from the capacitor case and configured to electrically connect the at least one capacitor to the target component. The capacitor case comprises at least first, second, and third fixture members for fixation of the capacitor case. The third fixture member is located to be separated from a virtual line connecting between a first reference point of the first fixture member and a second reference point of the second fixture member, and located to be closer to the target component than the first and second fixture members are. The busbar is located to be closer to the third fixture member than to the virtual line.

The third fixture member is located to be separated from the virtual line connecting between the reference points of the respective first and second fixture members, and located to be closer to the target component than the first and second fixture members are. Thus, locating the busbar to be closer to the third fixture member than to the virtual line makes it possible to suppress load stress received by the busbar to be a lower level, resulting in the busbar having an improved resistance to vibrations.

EMBODIMENT

The following describes capacitor devices, which are embodiments of the present disclosure, with reference to the accompanying drawings. In the embodiments, similar or equivalent parts between the embodiments, to which like reference characters are assigned, are omitted or simplified to avoid redundant description.

First Embodiment

The following describes a power converter 1, which includes a capacitor device 10 according to the first embodiment of the present disclosure. The power converter 1 of the first embodiment is used to be mounted in vehicles, such as electric vehicles or hybrid vehicles. In particular, the power converter 1, which is installed in a vehicle, serves as an inverter for converting input power supplied from a direct-current (DC) power source into output alternating-current (AC) power required to drive driving wheels of the vehicle.

Referring to FIG. 1, the power converter 1 includes a semiconductor stack unit, i.e. a semiconductor stack assembly, 3, a control circuit board 7, an inductor component 8, an energization circuit 9, a capacitor device 10, a discharge resistor board 24, and a case, i.e. a housing, 2. These components 3, 7, 8, 10, and 24 are installed, i.e. housed, in the case 2. The case 2 is made of, for example, a highly heat-dissipative material, such as a metallic material.

The semiconductor stack unit 3 a plurality of semiconductor modules 4 and a cooling mechanism CM including a set of cooling pipes 6, an introduction pipe 6a, and an exhaust pipe 6b. Each semiconductor module 4 incorporates therein a plurality of semiconductor elements 5 (see FIG. 2). The semiconductor modules 4 include first semiconductor modules 4A and second semiconductor modules 4B described later. A semiconductor module 4 may serve as an example of a target component such as that recited in the claims of this application.

The semiconductor stack unit 3 is configured such that the semiconductor modules 4 and the cooling pipes 6 are alternately stacked in a predetermined first direction X, to have a stack structure. The cooling pipes 6 include end cooling pipes that respectively constitute both ends of the set of the cooling pipes 6 in the first direction X. That is, each semiconductor module 4 has opposing major sides in the first direction X, and each semiconductor module 4 is sandwiched from the respective major sides by adjacent two cooling pipes 6 respectively located adjacent to the major sides in the first direction X.

Each of the cooling pipes 6 has a substantially rectangular plate-like shape, and has a longitudinal length in a second direction Y longer than a longitudinal length of each semiconductor module 4 in the second direction Y. Note that the first and second directions X and Y can define a third direction, which will be referred to as a height direction, Z perpendicular to the first and second directions X and Y. For example, the third direction Z in particular has opposing first and second orientations. The first orientation corresponds to an upward direction, and the second orientation corresponds to a downward direction.

The case 2 has, for example, a substantially rectangular or square parallelepiped shape having opposing top and bottom walls 2a1 and 2a2 that face each other in the third direction Z and opposing sidewalls 2b1 and 2b2 facing each other in the second direction Y. The case 2 also has unillustrated opposing sidewalls facing each other in the X direction.

Each of the cooling pipes 6 has opposing first and second ends in its longitudinal direction, i.e. the Y direction; the first end of each cooling pipe 6 is closer to the sidewall 2b1 than to the sidewall 2b2, and the second end of each cooling pipe 6 is closer to the sidewall 2b2 than to the sidewall 2b1.

The introduction pipe 6a is communicably connected to the first end of each cooling pipe 6, and the exhaust pipe 6b is communicably connected to the second end of each cooling pipe 6.

When a predetermined refrigerant, i.e. a coolant, is introduced into the introduction pipe 6a, the refrigerant flows into all the cooling pipes 6 from their first, and reaches the second ends of all the cooling pipes 6. Thereafter, the refrigerant flows through the exhaust pipe 6b to be exhausted from the exhaust pipe 6b. That is, introduction of the refrigerant into the cooling pipes and exhaust of the refrigerant from the cooling pipes 6 are repeatedly carried out, resulting in cooling of the semiconductor modules 4.

Each semiconductor module 4 includes a substantially rectangular parallelepiped package (body) having opposing first and second sides in the third direction Z. Each semiconductor module 4 includes control terminals 4a. Each of the control terminals 4a has a first end connected to a corresponding one of the semiconductor elements 5 installed in the corresponding semiconductor module 4. Each of the control terminals 4a also has a second end, which is opposite to the first end. The second end of each control terminal 4a is configured to protrude from the first side of the package to extend in the upward orientation of the third direction Z.

Each semiconductor module 4 also includes a positive DC terminal 4b, a negative DC terminal 4b, and an AC terminal 4d. Each of the positive DC, negative DC, and AC terminals 4b, 4c, and 4d has a first end commonly connected to the semiconductor elements 5 installed in the corresponding semiconductor module 4. Each of the positive DC, negative DC, and AC terminals 4b, 4c, and 4d has a second end, which is opposite to the first end. The second end of each of the positive DC, negative DC, and AC terminals 4b, 4c, and 4d is configured to protrude from the second side of the package to extend in the downward orientation of the third direction Z.

The control circuit board 7 is located to face the first side of each of the semiconductor modules 4, and the second ends of the respective control terminals 4a are connected to the control circuit board 7.

As described later, the control circuit board 7 controls on-off switching operations of each of the semiconductor elements 5 to thereby convert DC power input to the power converter 1 into AC power. A freely available semiconductor switching element, typically an insulated-gate bipolar transistor (IGBT) or a metal oxide semiconductor transistor (MOSFET), can be used as each semiconductor element 5.

The inductor component 8, which will also be referred to as a reactor component 8, is located at, for example, the lower side of the semiconductor stack unit 3 to face the semiconductor stack unit 3 in the third direction Z. The inductor component 8 includes a coil having opposing first and second ends.

The energization circuit 9 is connected to a DC power source, i.e. a battery, B having positive and negative terminals Ba and Bb (see FIG. 2); the positive terminal Ba of the battery B is connected to the first end of the coil of the inductor component 8, and the second end of the coil of the inductor component 8 is connected to the first semiconductor modules 4A. The battery B is installed in the vehicle. When energized by the battery B through the energization circuit 9, the coil of the inductor component 8 generates magnetic flux. That is, the coil of the inductor component 8 is operative to convert electrical energy supplied from the battery B into magnetic energy.

The capacitor device 10 is configured to supply DC power output from the battery B to the first semiconductor modules 4A, which serve as electronic and/or electric components. The capacitor device 10 is comprised of a filter capacitor 11 and a smoothing capacitor module 12M including a plurality of smoothing capacitors, in particular two smoothing capacitors, 12 for example connected in parallel to each other. The capacitor device 10 is also comprised of a capacitor case 13. Same types of capacitors can be used for the respective capacitors 10 and 12. The capacitor device 10 is also called a capacitor module or a capacitor assembly. Each of the capacitors 11 has opposing positive and negative electrodes.

The capacitor case 13 has a bottomed box shape having a top opening surface 14a, a bottom 14b opposing the top opening surface 14a, and a surrounding sidewall 14c mounted on the bottom 14b to constitute an enclosure space 14 between the bottom and the surrounding sidewall 14a. As illustrated in, for example, FIG. 3, each of the top opening surface 14a and bottom 14b has a substantially J shape, so that the surrounding sidewall 14c has a substantially J shape in its lateral cross section parallel to the bottom 14b.

The capacitor device 10 includes a plurality of fixture members, such as brackets, 16 each having thin plate-like shape. The fixture members 16 are attached to the sidewall 14c of the capacitor case 13, so that the capacitor case 13 is fixedly mounted to an inner surface of the case 2 with the fixture members 16 such that the capacitor case 13 is located between the semiconductor stack unit 3 and the sidewall 2b2 of the case 2 in the second direction Y.

Each of the fixture members 16 has a through hole 16a through which a bolt member 19 serving as a fastening member described below is fitted, and the bolt members 18 are threadably fastened to respective predetermined portions of the case 2, thus fastening the capacitor case 13 to the case 2.

That is, the capacitor case 3 is fixedly mounted to the case 2 at the fixture members 16. The capacitors 11 and 12 are installed in the enclosure space 14 of the capacitor case 13, and a resin filler, such as a potting resin filler, is filled in the enclosure space 14 of the capacitor case 13.

Specifically, the capacitor case 13 is disposed in the case 2 such that (1) The top opening surface 14a of the capacitor case 13 faces the positive and negative terminals 4b and 4c (2) The inductor component 8, and the bottom 14b of the capacitor case 13 faces the sidewall 2b2 of the case 2

(3) A longitudinal direction of the substantially J-shaped capacitor case 13 matches the first direction X In particular, the substantially J-shaped capacitor case 13 includes a first case portion 13C1 having a substantially box shape in which the smoothing capacitors 12 are installed. The first case portion 13C1 is located to face the positive and negative terminals 4b and 4c to be closer to the bottom wall 2a2 than to the top wall 2a1. The substantially J-shaped capacitor case 13 also includes a second case portion 13C2 communicably extending from the first case portion 13C1 toward the top wall 2a1 of the case 2. Each of the first and second case portions 13C1 and 13C2 has a predetermined width in the third direction Z, and the width of the first case portion 13C1 is longer than the width of the second case portion 13C2.

Figure 3:
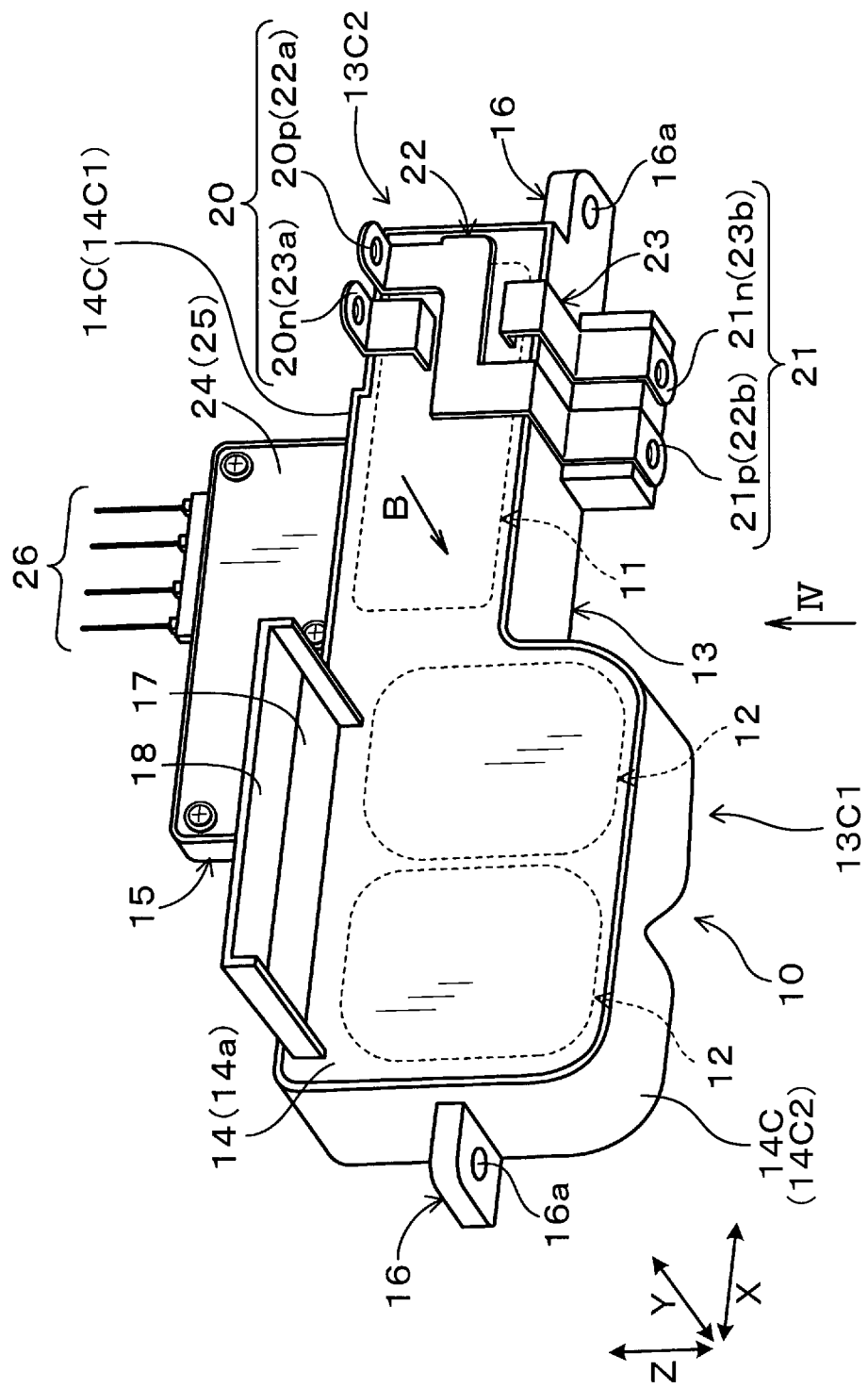
FIG. 3 is an enlarged perspective view of a capacitor device illustrated in FIG. 1.

As illustrated in, for example, FIG. 3, the smoothing capacitors 12 are installed in the first case portion 13C1, and the filter capacitor 11 is installed in the second case portion 13C2.

The capacitor device 10 includes a positive busbar 17 and a negative busbar 18, each of which is configured as a plate member.

The positive busbar 17 has opposing first and second ends, the first end of the positive busbar 17 is connected to the positive electrodes of the respective capacitors 12. The second end of the positive busbar 17 is drawn out from the resin filler filled in the first capacitor case 13C1 of the capacitor case 13 via the top opening surface 14a, and extends in the second direction Y perpendicular to the top opening surface 14a toward the positive DC terminal 4b. The second end of the positive busbar 17 is joined to, for example, welded to, the positive DC terminal 4b.

Similarly, the negative busbar 18 has opposing first and second ends, the first end of the negative busbar 18 is connected to the negative electrodes of the respective capacitors 12. The second end of the negative busbar 18 is drawn out from the resin filler filled in the first capacitor case 13C1 of the capacitor case 13 via the top opening surface 14a, and extends in the second direction Y perpendicular to the top opening surface 14a toward the negative DC terminal 4c. The second end of the negative busbar 18 is joined to, for example, welded to, the negative DC terminal 4c.

The discharge resistor board 24 has a substantially rectangular plate-like shape, and includes a discharge resistor 25 for discharging electrical charge stored in the capacitor device 10. The discharge resistor board 24 is electrically connected in parallel to each of the capacitors 11 and 12, and is located to be non-overlapped with a projected region of the capacitor case 13 on an X-Z plane perpendicular to the second direction Y.

In particular, the sidewall 14c of the capacitor case 13 has opposing first and second sidewall portions 14c1 and 14c2, and the sidewall 14c is located in the case 2 such that the first sidewall portion 14c1 faces the top wall 2a1 of the case 2, and the second sidewall portion 14c2 faces the bottom wall 2a2 of the case 2. The first sidewall portion 14c1 has a flat sidewall portion extending in the first direction X.

The capacitor device 10 includes a board support member 15, which has, for example, a rectangular board-like shape, extending from the first sidewall portion 14c1 of the sidewall 14 toward the top wall 2a1 of the case 2 in the Z direction. The discharge resistor board 24 is mounted to the board support member 15. This prevents thermal interference between the discharge resistor 25, which serves as an electric heating element, and the capacitors 11 and 12.

The discharge resistor board 24 is located to extend from the first sidewall portion 14c1 of the sidewall 14 toward the top wall 2a1 of the case 2 along the top opening surface 14a of the capacitor case 13. Because the potting resin filler is filled in the capacitor case 13, the top opening surface 14a of the capacitor case 13 can also be called a potting surface.

The capacitor device 10 includes voltage detection terminals 26 for measuring a voltage across each of the filter capacitor 11 and the smoothing capacitors 12. Each of the voltage detection terminals 26 are disposed to extend from the board support member 15 mounted to the first sidewall portion 14c1 of the sidewall 14 in the third direction Z toward the control circuit board 7. That is, the voltage detection terminals 26 are configured to project from the first sidewall portion 14c1 of the sidewall 14 of the capacitor case 13 so as to be arranged between the discharge resistor board 24 and the control circuit board 7. This configuration prevents the voltage detection terminals 26 from being adversely affected by electromagnetic noise generated from the capacitors 11 and 12.

The following describes the whole structure of the power converter 1, and the structure of each selected component of the power converter 1 in detail.

As described above, the control circuit board 7 is configured to control on-off switching operations of each of the semiconductor elements 5 to thereby convert DC power output from the battery B input to the power converter 1 into AC power.

Figure 2:
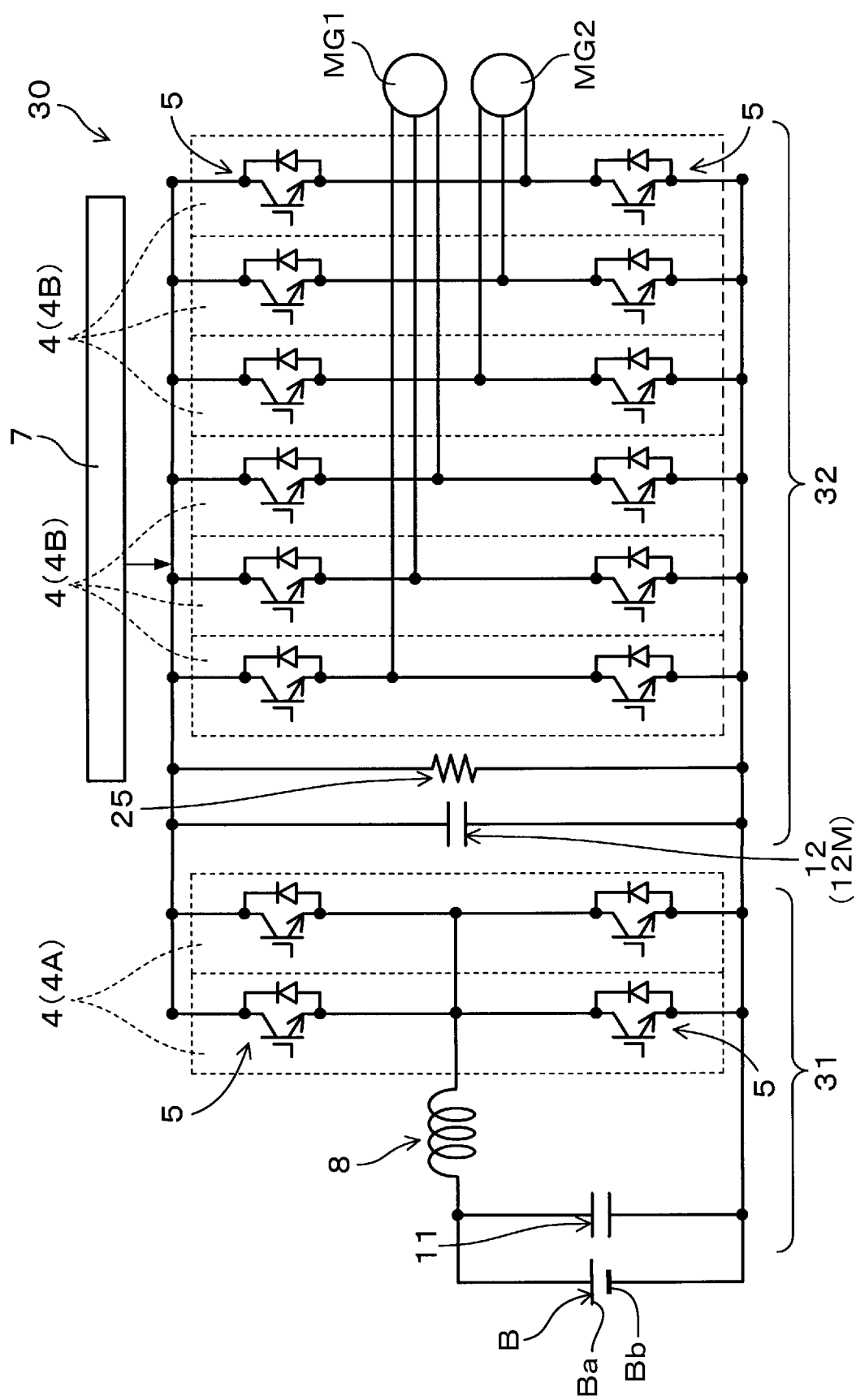
FIG. 2 is a circuit diagram of the power converter illustrated in FIG. 1.

For example, as illustrated in FIG. 2, the number of the semiconductor modules 4 is set to 8, and each of the semiconductor modules 4 is comprised of (1) A first semiconductor element 5 comprised of an upper-arm semiconductor switch, such as an IGBT, and a flyback diode connected in antiparallel thereto (2) A second semiconductor element 5 comprised of a lower-arm semiconductor switch, such as an IGBT, and a flyback diode connected in antiparallel thereto; the first and second semiconductor elements 5 are connected in series to each other The eight semiconductor modules 4 include (1) The first group of semiconductor modules 4A, which serves as a part of a voltage booster 31 of an inverter circuit 30

(2) The second group of semiconductor modules 4B, which serves as a power converter 32 of the inverter circuit 30

Specifically, the inductor component 8, filter capacitor 11, and semiconductor modules 4A serve as the voltage booster 31.

That is, the control circuit board 7 is configured to control on-off switching operations of each semiconductor switch included in the semiconductor modules 4A to thereby enable the voltage booster 31 to boost the DC voltage across the battery B. The filter capacitor 11 is operative to eliminate noise current component included in a direct current based on the DC voltage inputted from the battery B via a pair of voltage input terminals 20. The filter capacitor 11 is located electrically upstream of the smoothing capacitors 12 with respect to the battery B.

The smoothing capacitors 12 and semiconductor modules 4B serve as the power converter 32 of the inverter circuit 30.

The semiconductor modules 4B also is divided into a first set of semiconductor modules 4B for a first three-phase (U-, V-, and W-phase) AC motor-generator MG1, and a second group of semiconductor modules 4B for a second three-phase AC motor-generator MG2. That is, the AC terminals 4d of the respective semiconductor modules 4B of the first group are connected to the first three-phase AC motor-generator MG1. Similarly, the AC terminals 4d of the respective semiconductor modules 4B of the second group are connected to the second three-phase AC motor-generator MG2.

That is, the control circuit board 7 is configured to control (1) On-off switching operations of each semiconductor switch included in the first group of the semiconductor modules 4B to thereby enable the power converter 32 to convert DC power whose voltage has been boosted supplied from the voltage booster 31 into AC power, and supply the AC power to the first three-phase AC motor-generator MG1

(2) On-off switching operations of each semiconductor switch included in the second group of the semiconductor modules 4B to thereby enable the power converter 32 to convert the DC power whose voltage has been boosted supplied from the voltage booster 31 into AC power, and supply the AC power to the second three-phase AC motor-generator MG2

Supplying the AC power to each of the first and second three-phase AC motor-generators MG1 and MG2 causes the vehicle to travel The smoothing capacitors 12 are operative to smooth the DC voltage boosted by the voltage booster 31.

The discharge resistor 25, which is electrically connected in parallel to each of the capacitors 11 and 12, is operative to discharge electrical internal charge stored in each of the capacitors 11 and 12 while, for example, the power converter 1 is stopped.

Note that the number of components constituting the inverter circuit 30 and the arrangement of the components constituting the inverter circuit 30 can be changed as need arises.

As illustrated in FIG. 3, the J-shaped capacitor case 13 of the capacitor device 10, which is located such that the longitudinal direction matches the first direction X, includes the smoothing capacitors 12 and the filter capacitor 11 are installed to be aligned in the first direction X.

The pair of power input terminals 20 includes a positive terminal 20p and a negative terminal 20n, and the pair of power supply terminals 21 include a positive terminal 21p and a negative terminal 21n.

Specifically, the capacitor device 10 includes a bent plate-like positive busbar 22 mounted to the second case portion 13C2 of the capacitor case 13 and connected to the positive electrode of the filter capacitor 11. The positive busbar 22 has opposing first and second ends 22a and 22b that respectively serve as the positive terminal 20p of the pair of power input terminals 20, and the positive terminal 21p of the pair of power supply terminals 21.

Similarly, the capacitor device 10 includes a bent plate-like negative busbar 23 mounted to the second case portion 13C2 of the capacitor case 13 and connected to the negative electrode of the filter capacitor 11. The negative busbar 23 has opposing first and second ends 23a and 23b that respectively serve as the negative terminal 20n of the pair of power input terminals 20, and the negative terminal 21n of the pair of power supply terminals 21. In particular, a middle portion of the negative busbar 21 between the first and second ends 23a and 23b is embedded in the potting resin filler filled in the second case portion 13C2.

The positive and negative terminals 20p and 20n of the pair of power input terminals 20 are connected to the respective positive and negative terminals Ba and Bb of the battery B, and are also connected to the respective positive and negative terminals 21p and 21n of the pair of power supply terminals 21.

The positive terminal 21p of the pair of power supply terminals 21 is connected to the first end of the coil of the inductor component 8, and the second end of the coil of the inductor component 8 is connected to the connection point between each of the upper- and lower-arm switches of each of the first semiconductor modules 4A. The negative terminal 21n of the pair of power supply terminals 21 is connected to the lower-arm semiconductor switches of the respective first and second semiconductor modules 4A and 4B.

This configuration enables the DC voltage across the battery B is input to the filter capacitor 11, and the direct current based on the DC voltage is input to the coil of the inductor component 8.

The pair of power input terminals 20 and pair of power supply terminals 21 are located to be closer to the filter capacitor 11 than to the smoothing capacitors 12.

Figure 4:
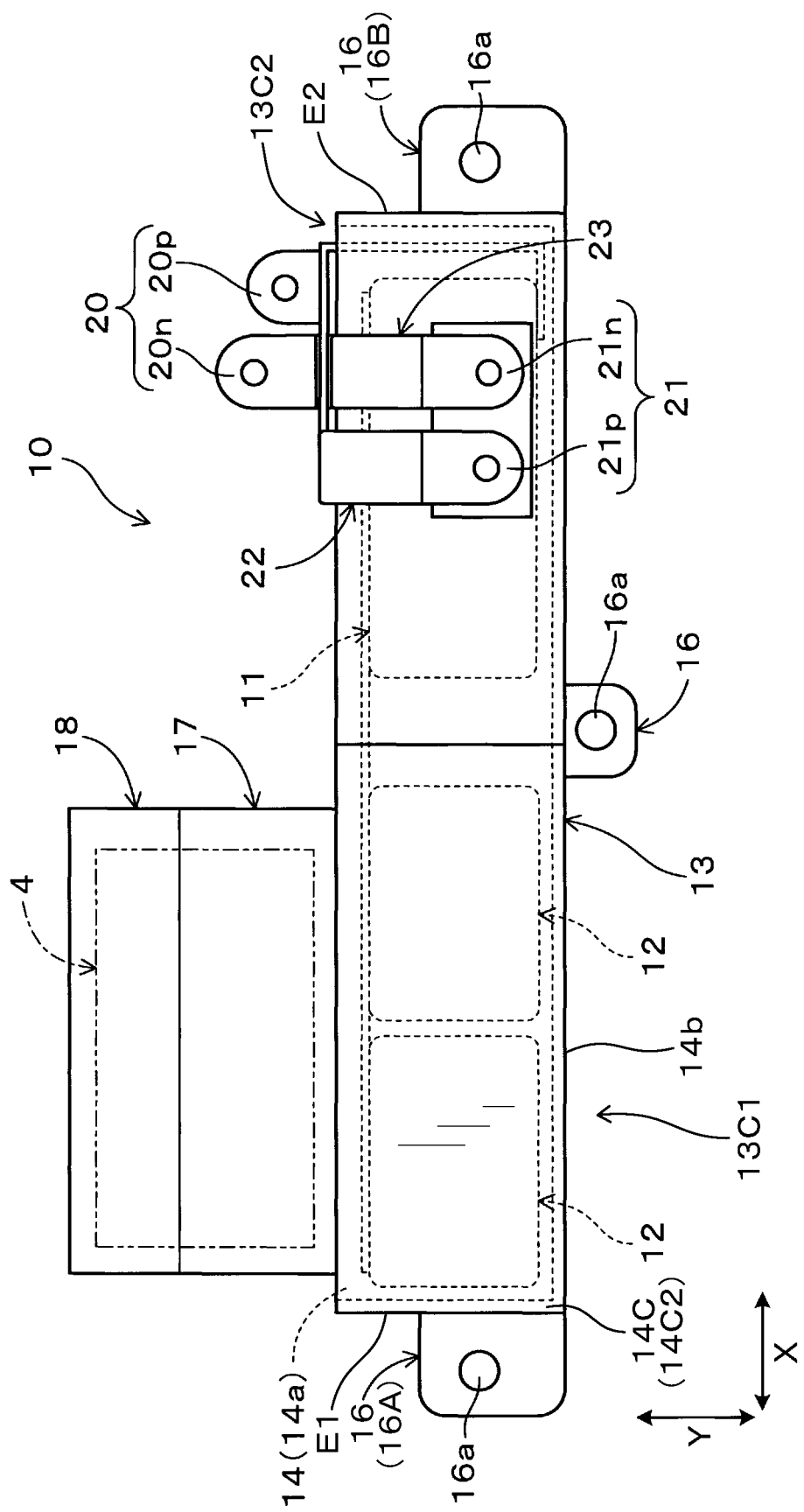
FIG. 4 is a plan view of the capacitor device illustrated in FIG. 3 when viewed from arrow IV.
Figure 5:
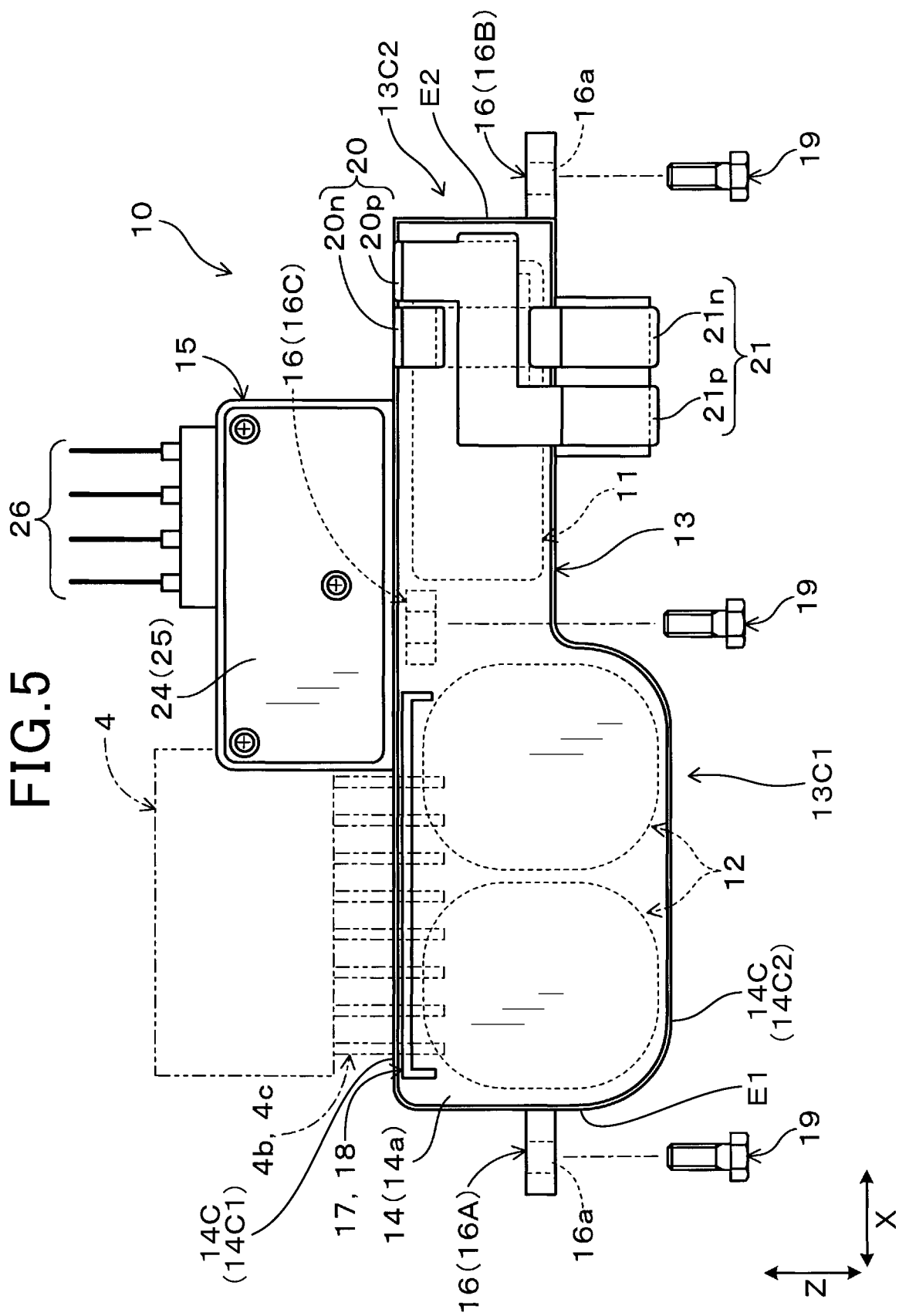
FIG. 5 is a plan view of the capacitor device illustrated in FIG. 3 when viewed from arrow V.

As illustrated in FIGS. 4 and 5, the capacitor device 10 includes the plurality of fixture members 16. In particular, the plurality of fixture members 16 include three fixture members 16A, 16B, and 16C. The fixture members 16A, 16B, and 16C are provided to the capacitor case 13 and are fixedly mounted to the case 2, so that the capacitor case 13 is fixedly mounted to the case 2.

Specifically, as illustrated in FIGS. 4 and 5, the bolt members 19, which have been fitted through the respective through holes 16a of the fixture members 16, threadably fastened to respective predetermined portions of the case 2, thus fastening the capacitor case 13 to the case 2.

Figure 6:
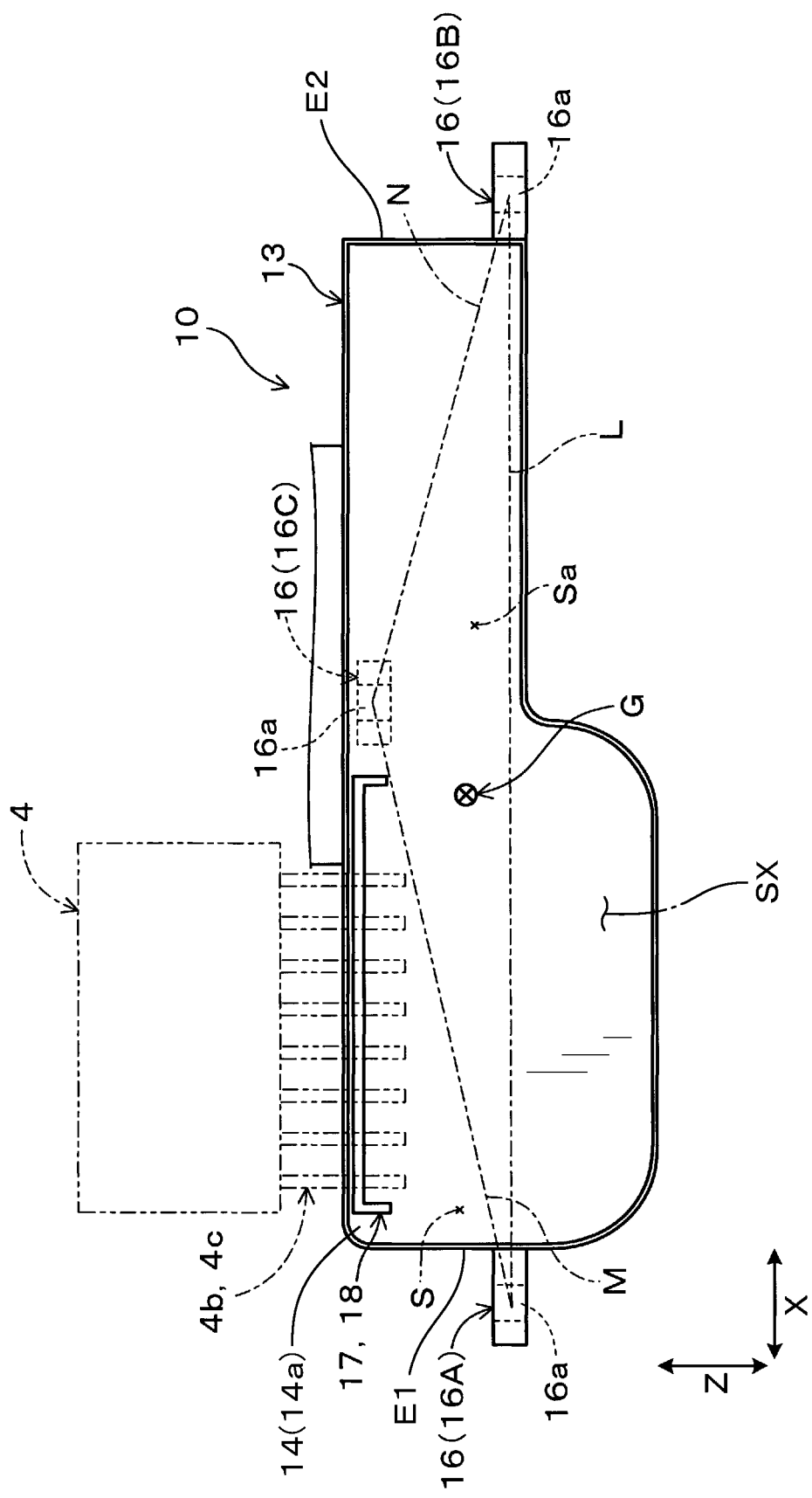
FIG. 6 is a plan view corresponding to FIG. 5 and schematically illustrating a positional relationship among main and sub fixture members illustrated in FIG. 5.

As illustrated in FIGS. 4 to 6, the fixture members 16A and 16B, which respectively serve as main fixture members, are respectively mounted to first and second longitudinal ends E1 and E2 of the case 13 in the first direction X, i.e. the longitudinal direction thereof. The remaining fixture member 16C, which serves as a sub fixture member, is mounted to a middle portion of the capacitor case 13 and located between the main fixture members 16A and 16B.

The main fixture members 16A and 16B have substantially the same height in the third direction Z as viewed from the second direction Y that is a normal direction to the top opening surface 14a of the enclosure space 14. In contrast, the sub fixture member 16C has a height in the third direction Z, which is different from the substantially mutually equal height of the main fixture members 16A and 16B in the third direction Z.

The sub fixture member 16C is located to be higher than the main fixture members 16A and 16B in the third direction, i.e. height direction, Z.

In particular, when a virtual line, i.e. an imaginary line, L is provided to connect between a reference point, for example, a center of the through hole 16a, of the main fixture member 16A and a reference point, for example, a center of the through hole 16a, of the main fixture member 16B, the sub fixture member 16C is located to be separated, i.e. deviated, from the virtual line L, and located to be closer to the semiconductor modules 4 than the main fixture members 16A and 16B are. That is, the virtual line L extends in the first direction X.

That is, the top opening surface 14a overlaps the virtual line L when viewed from the normal line to the top opening surface 14a, that is, the second direction Y.

Note that the width of the virtual line L in the third direction Z is set to be sufficiently smaller than the thickness of each fixture member 16A, 16B, and 16C.

The positive and negative busbars 17 and 18 are located to be closer to the sub fixture member 16c than to the virtual line L. That is, when a region of the capacitor case 13 is divided into a first region S and a second region SX with respect to the virtual line L as viewed from the second direction Y, the positive and negative busbars 17 and 18 are located to the first region S in the capacitor case 13. Because the first region S is closer to the sub fixture member 16C than the second region SX is, the first region S serves as a vibration resistance region S.

As described above, because the sub fixture member 16C is located to be separated from the virtual line L connecting between the main fixture members 16A and 16B, and located to be closer to the semiconductor modules 4 than the main fixture members 16A and 16B are, the first region S, i.e. the vibration resistance region S, is suitable for the busbars 17 and 18 to be electrically connected to the semiconductor modules 4.

Additionally, when a virtual line M is provided to connect between the reference point of the main fixture member 16A and the reference point of the sub fixture member 16C, and a virtual line N is provided to connect between the reference point of the main fixture member 16B and the reference point of the sub fixture member 16C, the three virtual lines L, M, and N constitute a triangular region Sa surrounded by the three virtual lines L, M, and N.

Because the triangular region Ss is arranged to be included in the first region S, the first region S, i.e. the vibration resistance region S, is more resistant to, i.e. is less subjected to, load stress due to vibrations.

Locating the busbars 17 and 18 to the capacitor case to be closer to the sub fixture member 16C than to the virtual line L suppresses load stress received by the busbars 17 and 18 to be a lower level, resulting in the busbars 17 and 18 having an improved resistance to vibrations.

In particular, locating the busbars 17 and 18 to the vibration resistance region S in the capacitor case 13 suppresses load stress received by the busbars 17 and 18 to be a lower level, resulting in the busbars 17 and 18 having an improved resistance to vibrations.

Additionally, even if the busbars 17 and 18 are integrated with the capacitors 11 and 12 so that the capacitor device 10 has a larger size and a larger weight, the above configuration of the capacitor device 10 maintains load stress received by the busbars 17 and 18 to be a lower level.

In particular, the capacitor device 10 is designed based on a simpler structural idea that the busbars 17 and 18 are located to the region S defined by the three fixture members 16A, 16B, and 16C.

The capacitor device 10 has an even more superior structure that, when a projected surface of the capacitor case 13 on an X-Z plane perpendicular to the second direction Y is viewed from the second direction Y, a center of gravity G of the projected surface, i.e. the top opening surface 14a of the capacitor case 13, is located to be within the triangular region Sa. This configuration results in the capacitor device 10 having a higher effect of suppressing vibrations of the capacitor device 10 as compared with another capacitor device whose center of gravity of the projected surface is located outside the triangular region Sa. This therefore results in more reduction in load stress received by the busbars 17 and 18.

A position of the sub fixture member 16C of the capacitor device 10 in the first direction X according to the first embodiment is located between a position of the capacitor 11 in the first direction X and a position of the capacitor 12 in the first direction X; the capacitors 11 and 12 are adjacent to each other.

Second Embodiment

Figure 7:
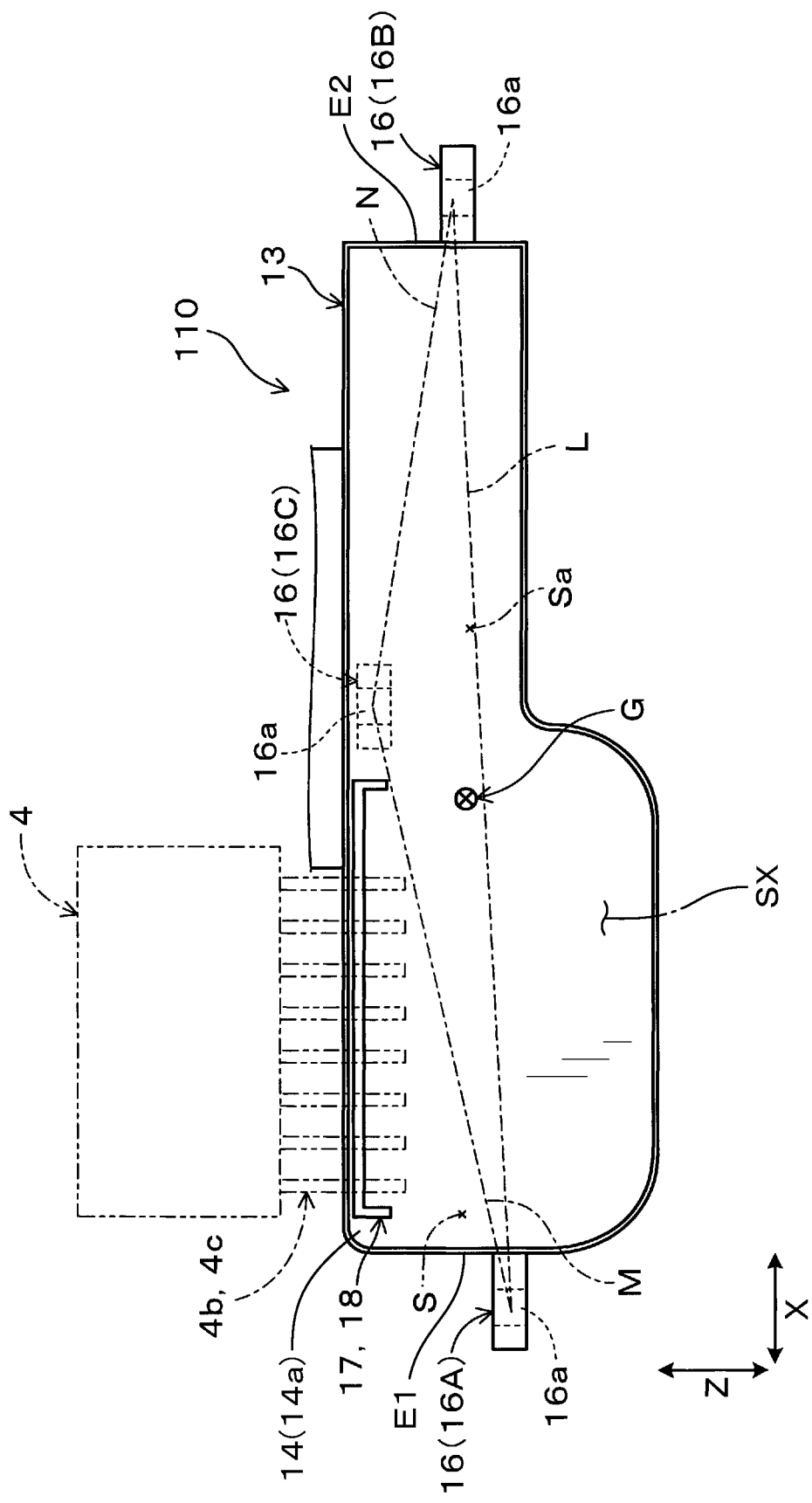
FIG. 7 is a plan view of a capacitor device according to the second embodiment of the present disclosure, which corresponds to FIG. 6.

The following describes the second embodiment of the present disclosure with reference to FIG. 7. The configuration and functions of a capacitor device 110 according to the second embodiment are mainly different from those of the capacitor device 10 according to the first embodiment by the following points. The following therefore mainly describes the different points.

As illustrated in FIG. 7, the main fixture members 16A, 16B, and 16C according to the second embodiment respectively have different heights in the third direction Z as viewed from the second direction Y. That is, the sub fixture member 16C is located to be higher than the main fixture member 16B in the height direction Z, and the main fixture member 16B is located to be higher than the main fixture member 16A in the height direction Z. This configuration results in the virtual line L is inclined with respect to the first direction X.

Even if the virtual line L is inclined with respect to the first direction X, locating the busbars 17 and 18 to the vibration resistance region S in the capacitor case 13 suppresses load stress received by the busbars 17 and 18 to be a lower level, resulting in the busbars 17 and 18 having an improved resistance to vibrations. Accordingly, the second embodiment obtains the same effects as those obtained by the first embodiment.

Third Embodiment

Figure 8:
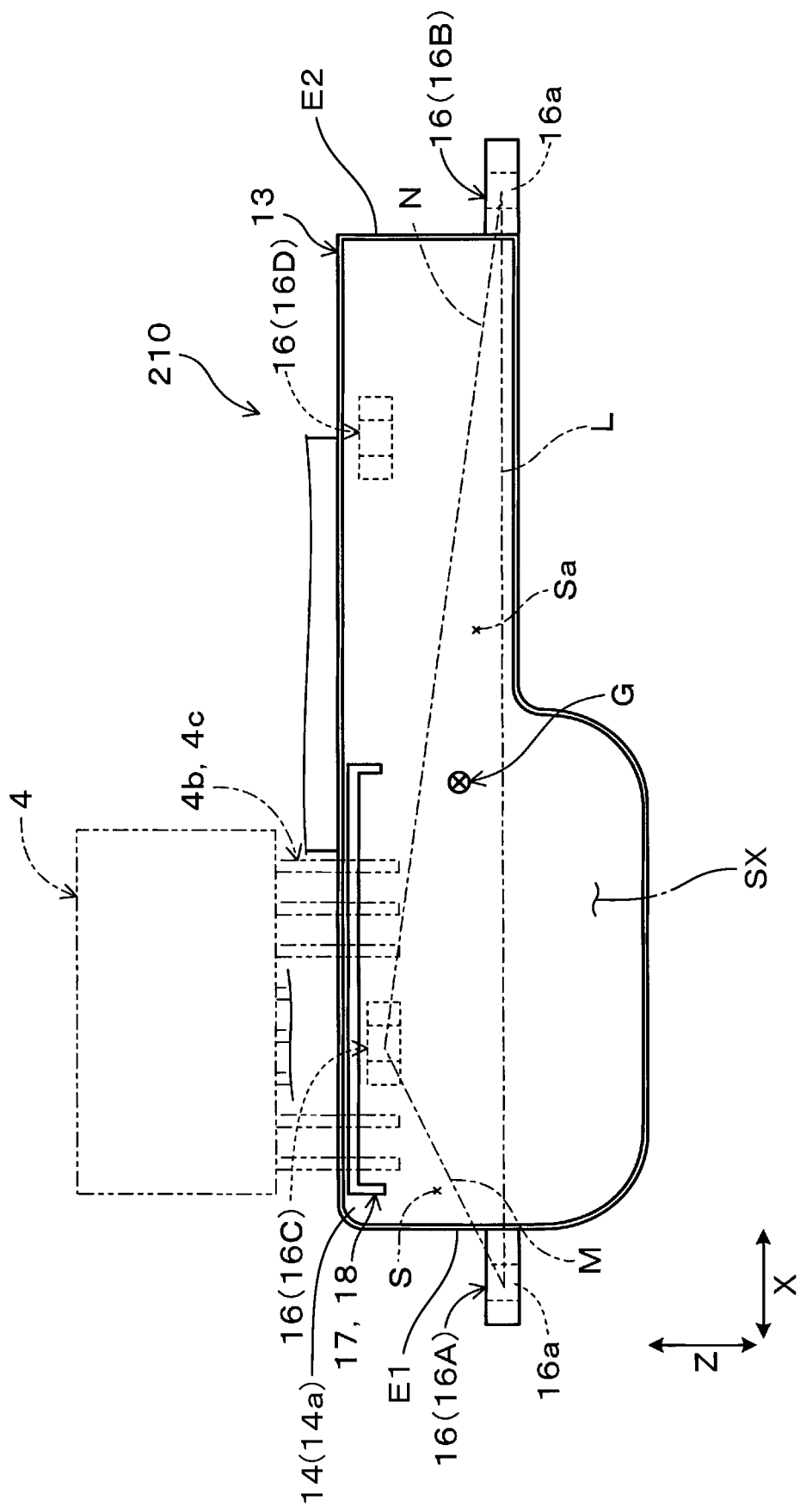
FIG. 8 is a plan view of a capacitor device according to the third embodiment of the present disclosure, which corresponds to FIG. 6.

The following describes the third embodiment of the present disclosure with reference to FIG. 8. The configuration and functions of a capacitor device 210 according to the third embodiment are mainly different from those of the capacitor device 10 according to the first embodiment by the following points. The following therefore mainly describes the different points.

As illustrated in FIG. 8, the capacitor device 10 includes the plurality of fixture members 16. In particular, the plurality of fixture members 16 include fourth fixture members 16A, 16B, 16C, and 16D. The fixture members 16A, 16B, 16C, and 16D are provided to the capacitor case 13 and are fixedly mounted to the case 2, so that the capacitor case 13 is fixedly mounted to the case 2.

As illustrated in FIG. 8, the main fixture members 16A and 16B are respectively mounted to the first and second longitudinal ends E1 and E2 of the case 13 in the first direction X, i.e. the longitudinal direction thereof.

In contrast, the remaining fixture members 16C and 16D, which serve as respective sub fixture members, are mounted to the middle portion of the capacitor case 13 and located between the main fixture members 16A and 16B.

The main fixture members 16A and 16B have substantially the same height in the third direction Z as viewed from the second direction Y. In contrast, the sub fixture members 16C and 16D each have a height in the third direction Z, which is higher than the substantially same height of the main fixture members 16A and 16B in the third direction Z.

Each of the sub fixture members 16C and 16D is located to be separated, i.e. deviated, from the virtual line L, and located to be closer to the semiconductor modules 4 than the main fixture members 16A and 16B are. In particular, the sub fixture member 16C is located to be closer to the semiconductor modules 4 than the sub fixture member 16D is.

Even if the number of fixture members is four, when a region of the capacitor case 13 is divided into the first region S and the second region SX with respect to the virtual line L as viewed from the second direction Y, the positive and negative busbars 17 and 18 are located to the first region S in the capacitor case 13. In other words, the capacitor case 13 has the first region S and the second region SX partitioned by the virtual line L.

Because the first region S is closer to the selected sub fixture member 16C, which is closer to the semiconductor modules 4 than the sub fixture 16D is, than the second region SX is, the first region S serves as the vibration resistance region S.

As described above, because the sub fixture member 16C is located to be separated from the virtual line L connecting between the main fixture members 16A and 16B, and located to be closer to the semiconductor modules 4 than the main fixture members 16A and 16B are, the first region S, i.e. the vibration resistance region S, is suitable for the busbars 17 and 18 to be electrically connected to the semiconductor modules 4.

Accordingly, locating the busbars 17 and 18 to the vibration resistance region S in the capacitor case 13 suppresses load stress received by the busbars 17 and 18 to be a lower level, resulting in the busbars 17 and 18 having an improved resistance to vibrations. Accordingly, the third embodiment obtains the same effects as those obtained by the first embodiment.

As an additional modification of the third embodiment, the first and second main fixture members 16A and 16B can be different in height in the third direction Z. In addition, as another modification of the third embodiment, five or more fixture members can be provided to the capacitor case 13 and can be fixedly mounted to the case 2, so that the capacitor case 13 can be fixedly mounted to the case 2.

In each of the first to third embodiments, the center of gravity G of the projected surface, i.e. the top opening surface 14a of the capacitor case 13, of the corresponding one of the capacitor devices 10, 110, and 210 is located to be within the triangular region Sa, but can be located outside the triangular region Sa.

In each of the first to third embodiments, the capacitor device 10 is configured to supply the DC power output from the battery B to the semiconductor modules 4 of the inverter circuit 30, but can be configured to transfer power between a power source and a target component including an electronic and/or electric component.

While illustrative embodiments of the present disclosure have been described herein, the present disclosure is not limited to the embodiments described herein, but includes any and all embodiments having modifications, omissions, combinations (e.g., of aspects across various embodiments), adaptations and/or alternations as would be appreciated by those in the art based on the present disclosure. The limitations in the claims are to be interpreted broadly based on the language employed in the claims and not limited to examples described in the present specification or during the prosecution of the application, which examples are to be construed as non-exclusive.

What is claimed is:

1. A capacitor device for transferring power between a power source and a target component including an electronic and/or electric component, the capacitor device comprising:
   at least one capacitor;
   a capacitor case configured to house the at least one capacitor;
   a busbar drawn out from the capacitor case and configured to electrically connect the at least one capacitor to the target component,
   wherein:
   the capacitor case comprises at least first, second, and third fixture members for attaching the capacitor case to another structure;
   the third fixture member is located to be separated from a virtual line connecting between a first reference point of the first fixture member and a second reference point of the second fixture member;
   the target component is separated from the virtual line and is located to be more separated from the virtual line than from the third fixture member; and
   the busbar is located to be closer to the third fixture member than to the virtual line.

2. The capacitor device according to claim 1, wherein:
   the capacitor case has a first region and a second region partitioned by the virtual line, the first region being closer to the third fixture member than the second region is; and
   the busbar is located in the first region.

3. The capacitor device according to claim 1, wherein:
   the capacitor case has:

an enclosure space in which the at least one capacitor is housed;
an end surface communicating with the enclosure space and overlapping the virtual line when viewed from a normal line to the end surface;
when first and second additional virtual lines are provided to respectively connect between the first reference point of the first fixture member and a reference point of the third fixture member, and between the second reference point of the second fixture member and the reference point of the third fixture member, the virtual line and the first and second additional virtual lines constitute a triangular region;
the end surface of the capacitor case has a center of gravity; and
the center of gravity of the end surface of the capacitor case is located within the triangular region.

4. The capacitor device according to claim 1, wherein:
the at least one capacitor comprises at least first and second capacitors housed in the capacitor case; and
a third capacitor is located between the first and second fixture members.

5. The capacitor device according to claim 1, wherein:
the capacitor case is configured to have:
a predetermined longitudinal direction; and
first and second ends in the predetermined longitudinal direction; and
the first and second fixture members are located at the respective first and second ends of the capacitor case.

6. The capacitor device according to claim 3, wherein:
the capacitor case is configured to have:
a predetermined longitudinal direction; and
first and second ends in the predetermined longitudinal direction; and
the first and second fixture members are located at the respective first and second ends of the capacitor case;
each of the first to third fixture members has a predetermined height in a direction perpendicular to the longitudinal direction and the normal direction; and
the height of the third fixture member is higher than the height of each of the first and second fixture members.

* * * * *